March 1, 1932. O. E. HARRIS 1,847,760
CONFECTION COATING APPARATUS
Filed Aug. 7, 1929
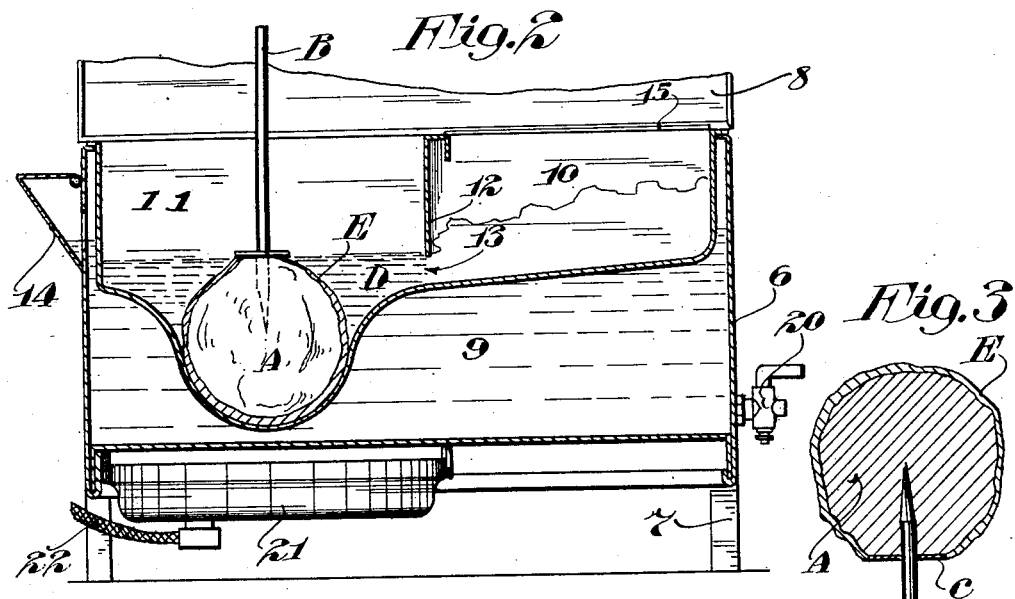
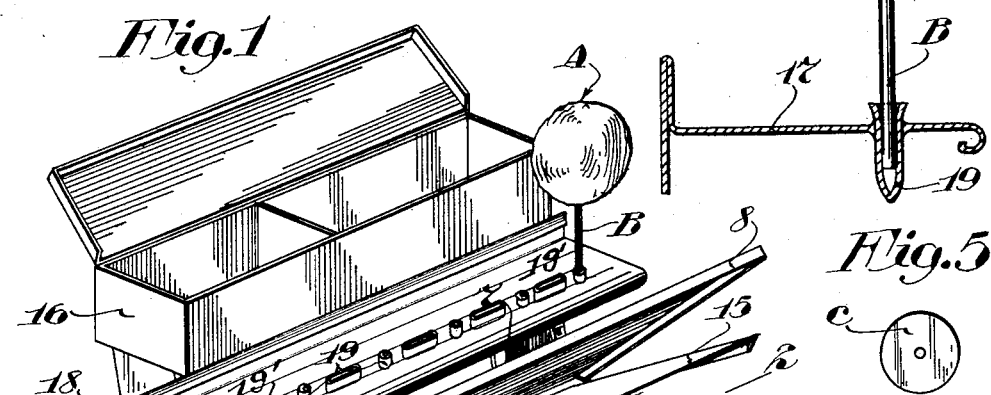
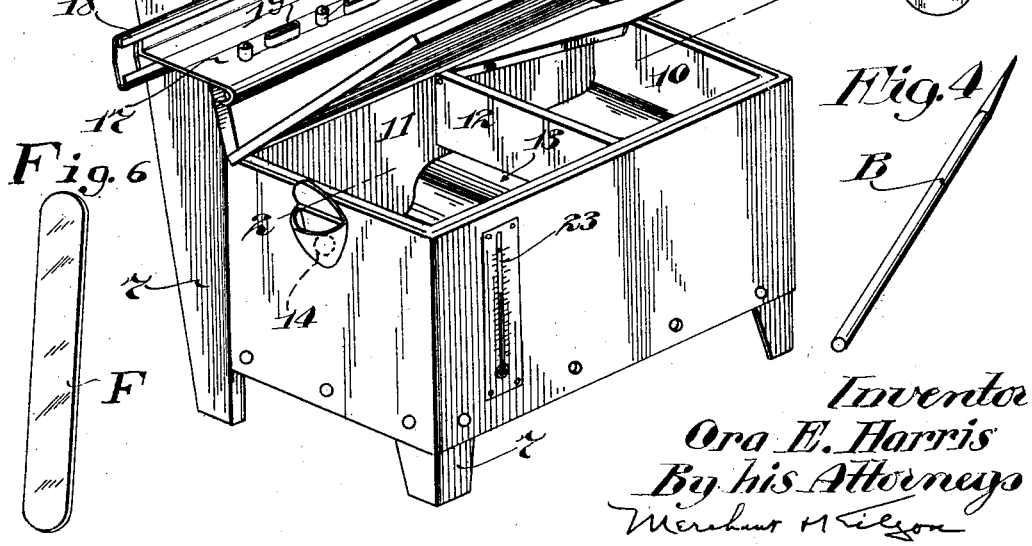
Inventor
Ora E. Harris
By his Attorneys Patented Mar. 1, 1932

1,847,760

UNITED STATES PATENT OFFICE

ORA E. HARRIS, OF KEARNEY, NEBRASKA

CONFECTION COATING APPARATUS

Application filed August 7, 1929. Serial No. 384,174.

My present invention relates to a confection coating apparatus intended for general use but especially well adapted for coating spheres of ice cream, cut by a dipper from bulk ice cream in a container, by submerging the same in a body of quickly congealing liquid coating material such as chocolate. These spheres of ice cream are mounted on sticks which afford convenient means by which the confection is handled during the different processes of coating, holding the same while the coating material is hardening and during the handling of the confection by the clerk and purchaser.

The object of the invention is to provide a confection coating apparatus by the use of which confection may be more easily and quickly coated in a highly efficient manner with a minimum amount of liquid coating material into which the confection is dipped and with the saving of said material. The invention further provides a combined drip apron and a hardening and transfer rack for the immediate disposal of the confection as fast as it is coated making it unnecessary for the operator to hold the same while hardening. The confection may be sold directly from the transfer rack as soon as it hardens or when the rack is filled the confection may be removed therefrom and placed in a refrigerator. By the use of the above coating apparatus the confection and coating material are handled in a very sanitary manner.

To the above end, generally stated, the invention consists of the novel devices and combinations of devices hereinafter described and defined in the claims.

In the accompanying drawings, which illustrate the invention, like characters indicate like parts throughout the several views.

Referring to the drawings:

Fig. 1 is a perspective view of the coating apparatus with the covers thereof open;

Fig. 2 is a fragmentary view principally in transverse vertical section taken on the line 2—2 of Fig. 1;

Fig. 3 is a detail view in section taken on the irregular line 3—3 of Fig. 1, on an enlarged scale;

Fig. 4 is a perspective view of one of the pointed sticks;

Fig. 5 is a face view of one of the caps; and

Fig. 6 is a perspective view showing another form of a stick.

The confection shown in the drawings is a sphere of ice cream A, cut from bulk ice cream in a container by a dipper of a well-known type, not shown, and mounted on a stick B having a pointed end that is pressed into said sphere. A cardboard disc C having an axial hole is pressed onto the stick B and determines the distance the pointed end of said stick is to be pressed into the sphere A. The diameter of the hole in the disc C is less than that of the stick B so that said hole will be enlarged by the application of the disc to the stick and thereby be frictionally held in place. The coating material, which may be assumed to be chocolate, is indicated by the letter D and the shell formed on the ice cream sphere A by said material is indicated by the letter E. Fig. 6 shows another form of a stick which is flat with rounded ends and indicated by the letter F.

The coating apparatus includes a rectangular metallic tank 6 supported on front and rear pairs of short legs 7 and provided with a cover 8 hinged to the back thereof, having a marginal capping flange which fits around the front and end members of said tank to form a tight joint therewith. Within this tank 6 at the bottom thereof is a water compartment 9 and above said compartment a melting vat or compartment 10 and a coating or dipping compartment 11. These compartments 10 and 11 are at opposite ends of the tank 6 and separated by a vertical partition 12 which extends from the front to the rear thereof. The compartments 10 and 11 at their sides and ends are spaced from the tank 6 to insulate the same therefrom, see Fig. 2, and the partition 12 is spaced above the bottom of the compartments 10 and 11 to leave a passageway 13 which leads from the compartment 10 to the compartment 11.

The bottom of the compartment 10 is slightly inclined so as to drain through the passageway 13 and into the compartment 11 and the bottom of the compartment 11 is depressed into the water compartment 9 and transversely contracted to semi-cylindrical form in cross section with its center substantially midway between the bottom of the compartment 11 and the upper edge of the passageway 13. The diameter of this semi-cylindrical portion of the bottom of the compartment 11 is slightly greater than that of the ice cream sphere A with sufficient clearance therebetween for the shell E formed by the coating material D on said ice cream, see Fig. 2.

In the left end of the tank 6 is a cover-equipped funnel-shaped lip 14 which leads to the water compartment 9 and through which said compartment may be filled with water G. The cover 8 is of such size as to cover both compartments 10 and 11. To keep the compartment 10 closed when the cover 8 is open during the coating process, and thereby protect the coating material therein and retain the heat in said compartment, there is provided a secondary cover 15 for said compartment which is hinged to the back thereof.

The rear legs 7 are extended materially above the top of the tank 6 and support a cover-equipped storage chest or receptacle 16 having two compartments, one for holding a supply of the sticks B and the other a supply of the cardboard discs C. Removably mounted on the apparatus below the chest 16 is a combined drip apron and a hardening and transfer rack 17 in the form of a flat plate or shelf having a rolled front edge portion and a flanged rear edge portion which is slidable and removably mounted in a horizontal track rail 18 secured to the rear legs 7 just below said chest. It is impotant to note that the track rail 18 extends materially to the left of the cover 8 so that during coating operation, the rack 17 may be positioned to permit the cover 8 to be fully opened and held in a rearwardly inclined position against the chest 16. When the cover 8 is thus held open the secondary cover 15 may be freely opened and closed.

The rack 17 further includes a row of longitudinally spaced sockets 19 into which the outer ends of the sticks B may be inserted to support said sticks in upright positions while the coating material on the confection is hardening. The bell-shaped upper ends of these sockets 19 make it extremely easy to insert the sticks B therein. This rack 17 serves another important function in that it catches the drip from the coated confection which, when congealed, may be removed from said rack and again placed in the melting compartment 10. When the rack 17 is filled with the coated ice cream spheres, said spheres may be removed from the rack, after the coating material is hardened, without danger of adhering together, and placed in a refrigerator.

When the sticks F are used for mounting the confection, one of their ends is pressed into the ice cream spheres at an angle and without the use of the discs C. For supporting this type of stick on the rack 17, said rack is provided with sockets 19' located between the sockets 19.

The tank 6 is provided with a valve-equipped drain 20. On the under side of the compartment 9 is an electric heating element 21 with lead wires 22 for connecting said element to an outlet or lamp socket. This heating element 21 keeps the water G in the compartment 9 at the proper temperature so that it will melt the coating material E in the compartment 10 and from which compartment the melted coating material will automatically run into the compartment 11. In case a new supply of coating material is needed, one or more cakes of coating material may be placed in the melting compartment 10 where it will melt and automatically run into the dipping compartment 11 without stopping the coating operation.

By the use of the coating apparatus a sphere of ice cream is cut from bulk ice cream in a container in a manner heretofore stated and one of the sticks B at its pointed end is pressed into the sphere until stopped by the cardboard disc C. This sphere A is held by the stick B and dipped into the liquid coating in the compartment 10 which is kept in liquid form of the proper consistency by the hot water G in the compartment 9. The depth of the coating material D in the compartment 11 is such as to completely cover the sphere of ice cream A, adhere to the edge of the cardboard disc C and seal the joint between said disc and the shell E. This disc C keeps the coating material out of contact with the stick and prevents the same from running down said stick when the coated confection is placed in the rack 17. At the completion of the dipping process the confection is lifted by the stick B from the compartment 11 inverted and the outer end of said stick inserted into one of the sockets 19 in the rack 17. As heretofore stated, when the rack 17 is filled with the coated ice cream spheres, they are removed therefrom and placed in cold storage. In case the refrigerator should be located some distance from the coating apparatus, the rack 17 may be removed from the apparatus and used to transfer the confection to the refrigerator in a quick, convenient and sanitary manner.

From the above description it is evident that the confection may be very quickly and efficiently dipped in a convenient and sanitary manner and with the use of a minimum amount of coating material. The formation of the bottom of the compartment 11 is such that practically all of the coating material may be used. As the coating material, in the compartment 10, is melted by the hot water surrounding the same, it will automatically flow into the compartment 11 and keep the liquid coating material therein at the proper elevation by being replenished when necessary. The chest 16 is so located that the sticks and caps may be readily removed therefrom and assembled for use, and said chest is normally closed so as to keep the sticks and caps in a sanitary condition.

Mounted on the tank 6 is a thermometer 23 for indicating the temperature of the water G.

The separation of the melting compartment 10 from the dipping compartment 11 and the location of the former above the latter with the passageway therebetween, whereby the coating material melted in the heating compartment 10 will automatically flow into the dipping compartment 11, is highly important in that congealed coating material may be added to the supply in the melting compartment from time to time without interrupting the dipping process in the dipping compartment 11.

It is the general practice in the use of this coating apparatus to use up the contents of say a five gallon tub of ice cream in the manufacture of the coated confection and place said confection in cold storage. In making up such a large supply of coated confection, it is important that the dipping process proceeds without interruption and it is also important and necessary to add congealed coating material to the supply in the melting compartment several times during the coating of a batch of the confection.

On the other hand, it is highly important that the position and shape of the dipping compartment or sump is such that substantially all of the coating material may be used up by the process of dipping the frozen ice cream therein

What I claim is:

1. An apparatus of the class described comprising a dipping compartment the bottom portion of which in cross-section is substantially the same size as the frozen confection to be dipped in said compartment, a melting compartment the bottom of which is upwardly inclined from the dipping compartment, means for melting congealed coating material in the melting compartment and maintain it in the same general condition in the dipping compartment and a passageway between said two compartments through which the melted coating material automatically flows from the melting compartment to replenish the supply in the dipping compartment as the same is taken up by the dipping process and whereby congealed coating material may be added to the supply in the melting compartment without interrupting the dipping process in the coating compartment.

2. An apparatus of the class described, comprising a receptacle having a transverse wall defining a lower heating compartment and an upper dipping and melting compartment, said wall being downwardly inclined from one end of said receptacle and configured adjacent the other end of said receptacle to provide a dipping sump of substantially the same cross section of articles to be coated, and a partition in the upper compartment adjacent the dipping sump and having a passageway through which coating material is supplied to the sump.

In testimony whereof I affix my signature.

ORA E. HARRIS.